United States Patent [19]
Yoshida et al.

[11] Patent Number: 4,604,869
[45] Date of Patent: Aug. 12, 1986

[54] POROUS CERAMIC STRUCTURE

[75] Inventors: Hitoshi Yoshida, Okazaki; Yukihisa Takeuchi, Chita; Yasunao Miura, Kasugai, all of Japan

[73] Assignee: Nippondenso Co., Ltd., Kariya, Japan

[21] Appl. No.: 739,100

[22] Filed: May 30, 1985

[30] Foreign Application Priority Data

May 31, 1984 [JP] Japan ............... 59-112302

[51] Int. Cl.$^4$ .......... F01N 3/02; B01D 39/20
[52] U.S. Cl. .................. 60/311; 55/523; 55/DIG. 30
[58] Field of Search ............ 60/311; 55/DIG. 30, 55/523, 466; 422/180

[56] References Cited
U.S. PATENT DOCUMENTS

| | | | |
|---|---|---|---|
| 4,264,346 | 4/1981 | Mann | 55/523 |
| 4,415,344 | 11/1983 | Frost et al. | 55/523 |
| 4,519,820 | 5/1985 | Oyobe | 55/466 |

Primary Examiner—Douglas Hart
Attorney, Agent, or Firm—Cushman, Darby & Cushman

[57] ABSTRACT

A honeycomb type porous ceramic structure used for collecting particulates exhausted from an internal combustion engine. The porous ceramic structure comprises porous partition walls forming a multiplicity of passage regions positioned adjacent to one another and extending from the upstream side to the downstream side of the porous ceramic structure, and partition portions sectioning the passage regions. And, the passages region are respectively provided with at least one partition portion and some of the passage regions are provided with at least two partition portions, so that said some of the passage regions form at least one intermediate passage inlet passage and outlet passage. The porous ceramic structure is so structured that a fluid such as an automobile exhaust gas pass through the porous partition wall a plurality of times before it comes out of the structure.

15 Claims, 23 Drawing Figures

POROUS CERAMIC STRUCTURE

BACKGROUND OF THE INVENTION

1. Field of the Invention

This invention relates to a porous ceramic structure and particularly to a porous ceramic structure for collecting carbon particulates exhausted from diesel engines.

2. Description of the Prior Art

The U.S. Pat. No. 4,264,346 and No. 4,415,344 describe porous ceramic structures respectively comprising a multiplicity of inlet passages, of which front ends are open and rear ends are closed, a multiplicity of outlet passages, of which rear ends are open and the ends opposing to the rear ends are closed, and porous walls positioned between the passages.

Figures 19, 20, 21, 22:
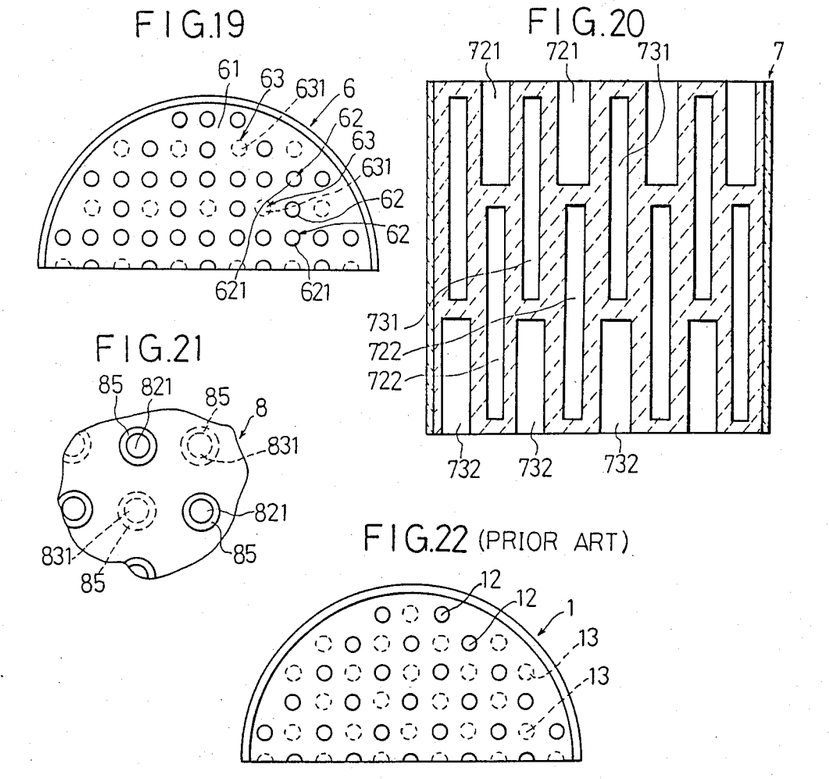
FIG. 19 is a partial plan view of a sixth embodiment of the porous ceramic structure of this invention.
FIG. 20 is a sectional front view of a seventh embodiment of the porous ceramic structure of this invention.
FIG. 21 is a partially magnified plan view of an eighth embodiment of the porous ceramic structure of this invention.
FIG. 22 is a partial plan view of a conventional porous ceramic structure.
Figure 23:
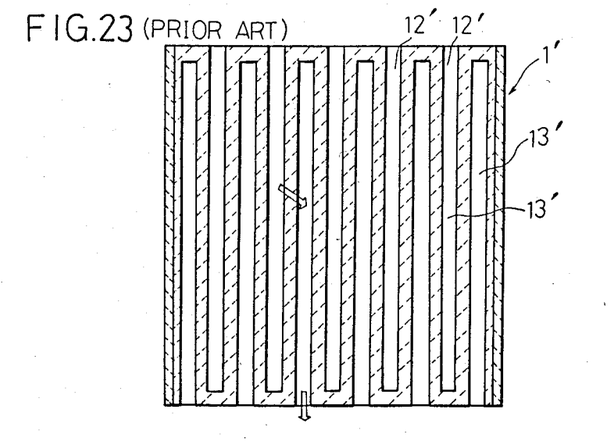
FIG. 23 is a sectional view of the conventional porous ceramic structure illustrated in FIG. 22.

As illustrated in FIGS. 22 and 23, the inlet passages 52' and outlet passages 53' are positioned next to one another in one type of the structure (U.S. Pat. No. 4,264,346 and No. 4,415,344), and the inlet passages are positioned around outlet passages in another type of the structure (U.S. Pat. No. 4,415,344).

An automobile exhaust gas, for example, first enters the inlet passages 52' and then passes through the porous walls 2' to enter into the outlet passages 53', and then flows out of the structure 1'.

Particulates contained in the automobile exhaust gas or the like are collected by a part of the porous partition walls in these structures.

Figure 10:
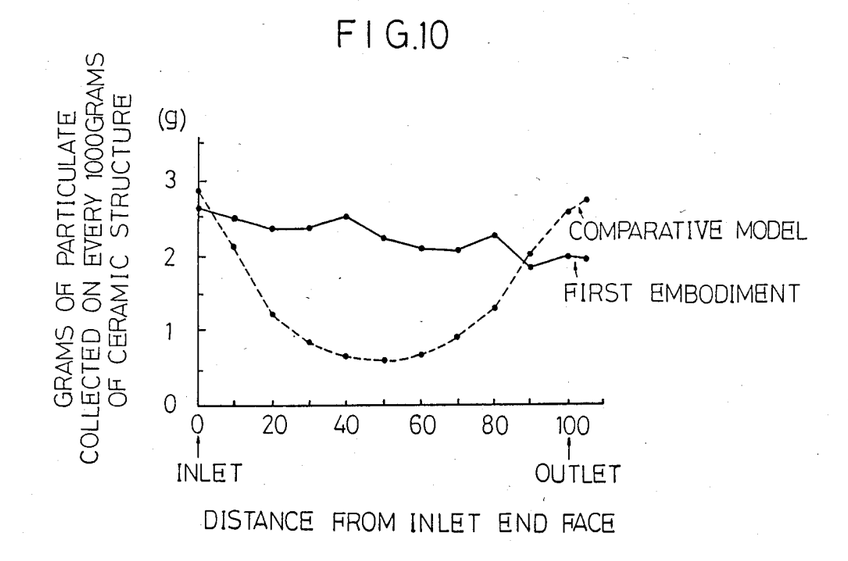
FIG. 10 is a graph showing a comparison of the first embodiment and a comparative model in relation to their particulates collection efficiency.

The intermediate portions of the inlet passages do not collect the particulates efficiently in conventional porous ceramic structures. The particles, however, are collected mostly at the opening end and bottom end of the inlet passages by conventional porous ceramic structures as shown in FIG. 10.

It is considered that the inertia force of the exhaust gas flow causes this inefficiency in conventional porous ceramic structures.

Particulates can not be collected evenly in the conventional structures and the particulates collection efficiency of the conventional structures is not satisfactory.

SUMMARY OF THE INVENTION

It is an object of this invention, therefore, to provide an improved porous ceramic structure, the intermediate portions of which are effectively utilized for the particulates collection, in order to collect particulates evenly and thereby enhance the particulates collection efficiency.

The porous ceramic structure of this invention has a ceramic body in which a multiplicity of passage regions positioned adjacent to one another and porous walls positioned between the passage regions are provided. The multiplicity of passage regions comprise a first group of pasages, of which the both ends are closed, and a second group of passages, of which one end is open at the ends of the porous ceramic structure and the other end is closed. The two groups of passages are separated by partition portions provided therebetween. A fluid enters into the porous ceramic structure from open ends of one type of the second group of passages which are positioned at the upstream side of the structure and separated from the first group of passages by the partition portions and then passages through the porous walls to enter into the first group of passages.

Then, the fluid passages through the porous walls again to enter into another type of the second group of passages which are positioned at the downstream side of the structure and separated from the first group of passages by the partition portions. The fluid comes out of the porous ceramic structure from the open ends of the second group of passages positioned at the downstream side of the structure.

BRIEF DESCRIPTION OF THE DRAWINGS

The exact nature of this invention, as well as other objects and advantages thereof, will be apparent from the consideration of the following specification particularly when considered in connection with the accompanying drawings in which:

FIGS. 4-9 are partial plan views and sectional front views of the foams employed in manufacturing the first embodiment of the porous ceramic structure shown in FIGS. 1 and 2;

FIG. 4 is a partial plan view of one of the foams employed in manufacturing the first embodiment;

FIG. 5 is a sectional front view of the foam illustrated in FIG. 4;

FIG. 7 is a sectional front view of the foam illustrated in FIG. 6;

FIG. 9 is a sectional front view of the foam illustrated in FIG. 8;

DETAILED DESCRIPTION OF THE PREFERRED EMBODIMENTS

First Embodiment

Figure 1:
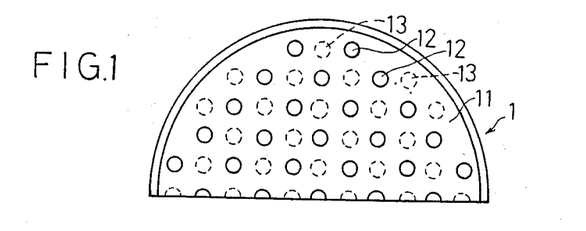
FIG. 1 is a partial plan view of a first embodiment of the porous ceramic structure of this invention.
Figure 2:
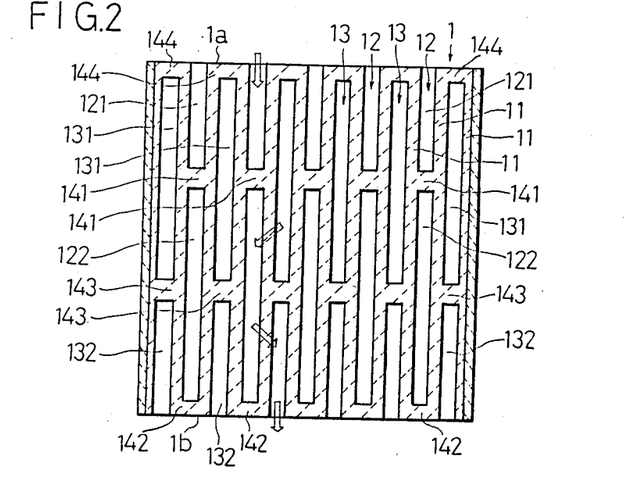
FIG. 2 is a sectional front view of the first embodiment of the porous ceramic structure of this invention illustrated in FIG. 1.

With reference to the drawings, particularly to FIGS. 1 and 2 illustrating a first embodiment of the porous ceramic structure of this invention, the porous ceramic structure 1 comprises porous partition walls 11 forming a multiplicity of two types of passage regions 12, 13 adjacent to one another and extending from the upstream side 1a to the downstream 1b of the porous ceramic structure 1 and partition portion 141, 142, 143, 144 sectioning said passage regions 12 and 13. One type of the passage regions 12, which a fluid such as an automobile exhaust gas flows into, are respectively provided with two partition portions, one intermediate partition portion 141 which is positioned at an intermediate portion thereof and one lower-end partition portion 142 thereof to form two passages, one inlet passage 121 and a second intermediate passage 122.

The other type of passage regions 13 positioned adjacent to the one type of passage regions 12 are respectively provided with two patition portions, one intermediate partition portion 143 which is positioned at the side of intermediate portion of the second intermediate passage 122 and one partition portion 144 positioned at the upper-end thereof to form two passages, a first intermediate passage 131 and one outlet passage 132.

At first, fluid enters into the inlet passages 121. Then the fluid passes the porous walls 11 and enters into the first intermediate passages 131. The fluid again passes the porous walls 11 and enters into the second intermediate passages 122. Finally the fluid enters into the outlet passages 132 by passing the porous walls 11 and comes out of the outlet passages 132.

The method for manufacturing this structure 1 is described hereunder.

An organic compound foam having a three dimensional network structure and the shape of which is identical to that of the structure 1 is impregnated with a ceramic slurry. Then the organic compound is burnt out to obtain the structure 1.

The method for manufacturing the structure 1 is described in detail hereunder.

Polyurethane foams 150, 160, and 170 having as indicated in FIGS. 4–9 are formed. Each of the foam bodies comprises porous portion walls forming a multiplicity of holes. The porous partition walls are made of the three dimentional structures (shown in FIG. 3) composed of frames 22 and pores 21.

Figure 4:
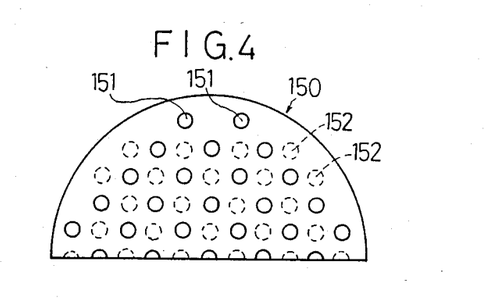
Figure 5:
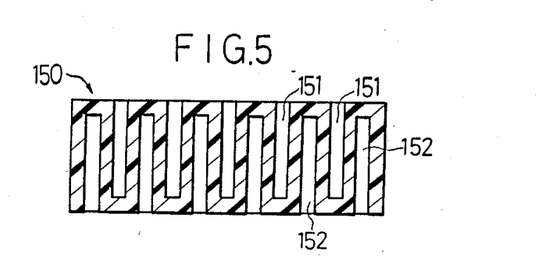

The holes 151 of the foam 150 indicated in FIGS. 4 and 5 correspond to the inlet passages 121 of the ceramic structure 1 indicated in FIGS. 1 and 2, and holes 152 of the foam 150 correspond to upper-halves of the first intermediate passages 131. Holes 161 of the foam 160 indicated in FIGS. 6 and 7 correspond to lower-halves of the first intermediate passages 131. Holes 162 correspond to upper-halves of the second intermediate passages 122. Holes 171 of the foam 170 indicated in FIGS. 8 and 9 correspond to lower-halves of the second intermediate passages 122. Holes 172 correspond to the outlet passages 132. The holes 152 and the holes 161 have an identical form and are positioned on common axes, and the holes 162 and the holes 171 have an identical form and are joined on common axes.

The polyurethane foams 150, 160 and 170 are impregnated with a ceramic slurry.

The ceramic slurry used for the impregnation may be a mixture of a mixed powder including magnesium oxide(MgO), aluminium oxide($Al_2O_3$) and silicon dioxide ($SiO_2$), which becomes a cordierite composition by firing, such bunders as methyl cellulose, polyvinyl alcohol and water.

As an alternative to the ceramic slurry, the ceramic powder used therefor may be cordierite powder made from the above mixed powder which was heated to become cordierite ceramics and then powdered.

As another alternative to the ceramic slurry, the ceramic powder used therefor may be a mixture of the above two.

In order to integrate the polyurethane foams 150, 160 and 170 which are impregnated with the ceramic slurry, the foam 150 is placed upon the foam 160 in a manner that the holes 152 of the foam 150 and the holes 161 of the foam 160 join and the foam 160 is placed upon the foam 170 in a manner that the holes 162 of the foam 160 and the holes 171 of the foam 170 join.

Then, the foams are dried at a temperature of 120° C. for 2 hours. The dried foams are joined by binders. Then, the structure comprising the foams is coated with the ceramic slurry and then the coated structure is dried again. Thereupon, the structure is fired in a furnace with an oxidation ambient atmosphere at a temperature of 1300° C.–1470° C. for 10 hours to burn and eliminated the polyurethane foams so as to obtain the structure 1.

Referring now to FIG. 2, a fluid such as an exhaust gas containing particulates approaches the inlet end face 1a and flows into a multiplicity of the inlet passages 121. Then, the fluid passes through the porous walls 11 to enter from the inlet passages 121 into the first intermediate passages 131. Then, the fluid passes through the porous walls 11 to enter from the first intermediate passages 131 into the second intermediate passages 122. The fluid further passes through the porous walls 11 to enter from the second intermediate passages 122 into the outlet passages 132 and come out of the open ends of the outlet passages 132.

Figure 3:
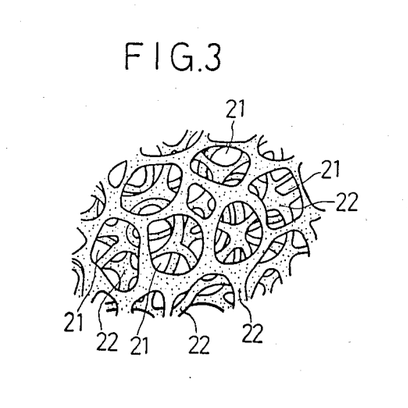
FIG. 3 is a partially magnified sectional view diagrammatically showing the framework of the first embodiment of the porous ceramic structure.

Accordingly, the fluid must pass through the porous walls 11 three times before it comes out of the structure 1 as indicated in FIG. 2, and the particulates contained in the fluid collide and deposit on the these dimensional frames 22 shown in FIG. 3.

Provided that the probability of the particulates collection is P(a) when the particulates (a) passes through one of the porous walls 11, the probability of the particulates collection when they pass through the porous walls 11 three times becomes $$P(a)+\{1-P(a)\}\times P(a)+\{1-P(a)\}^2\times P(a).$$

Thus, the collection efficiency is enhanced when the particulates pass through the porous walls 11.

The structure 1 was mounted in the exhaust pipe of diesel engine with a cylinder displacement of 2.2 liter to test its collection of the particulates exhausted from the engine.

Another test was conducted with comparative model 1', indicated in FIGS. 22 and 23, having inlet passages 12', outlet passages 13 and porous walls 11' therebetween. The exhaust gas passes through the porous walls 11' only once in this comparative model 1'.

The structure 1 of this invention is 72 mm in diameter and about 100 mm in length. Inlet passages 121 of the structure 1 are 3 mm in diameter and 45 in total. The second intermediate passages 122 of the structure 1 are 3 mm in diameter and 45 in total. The first intermediate passages 131 of the structure 1 are 3 mm in diameter and 44 in total. Outlet passages 122 of the structure 1a are 3 mm in diameter and 44 in total.

The comparative model 1' has a total of 45 inlet passages 12' which are 3 mm in diameter and a total of 44 outlet passages 13' which are 3 mm in diameter. The average pore size 21 of these ceramic structure is 0.2 mm in diameter.

FIG. 10 illustrates the distribution of particulates after three hours of the collection, in which the lateral axis indicates distances from the inlet end face and the vertical axis indicates the grams of the particulates collected on every 100 g of the ceramic structure.

As compared with the collection by the comparative model 1', the particulates were distributed evenly in the structure 1 of this invention. The average collection efficiency after three hours of the collection was 59.0% for the structure 1 of this invention and 35.0% for the comparative model 1'.

Although cordierite ceramics is used in this embodiment, such ceramics as silicon nitride, silicon carbide, $\beta$-spodumen, alumina and mullite can be also used for the ceramic structure of the present invention.

Second Embodiment

Figure 11:
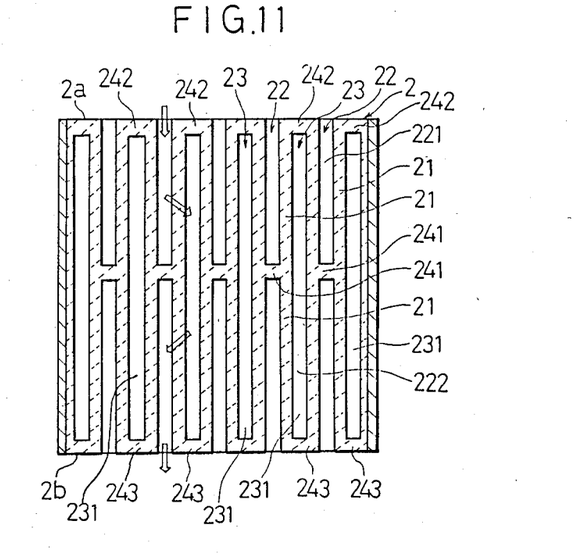
FIG. 11 is a sectional front view of a second embodiment of the porous ceramic structure of this invention.

With reference to FIG. 11 showing a second embodiment of this invention, the porous ceramic structure 2 comprises porous partition walls 21 forming a multiplicity of two types of passage regions 22, 23 adjacent to one another and extending from the upstream side 2a to the downstream side 2b of the porous ceramic structure 2 and partition portions 241, 242, 243 sectioning said passage regions 22, 23. In this porous ceramic structure 2, a fluid such as an exhaust gas passes through the walls 21 twice. One type of the passage regions 22, which the fluid flows into, are respectively provided with one intermediate partition portion 241 to form two end passages, one inlet passage 221 and one outlet passage 222.

The other type of the passage regions 23 positioned adjacent to the passage regions 22 are respectively provided with two end partition portions, an upstream side partition portion 242 and a downstream side partition portion 243 to form one intermediate passage 231.

A fluid approaches the upstream side 2a and enters into the inlet passages 221. Then the fluid flows from the inlet passages 221 into the intermediate passages 231 through the porous walls 21, and the fluid enters from the intermediate passages 231 into the outlet passages 222 through the walls 21, and the fluid flows out the open ends of the outlet passages 222.

Therefore, the porous ceramic structure 2 of this embodiment is so constructed that a fluid such as an automobile exhaust gas pass through the porous partition walls 21 twice before it comes out of the structure 2.

Figure 6:
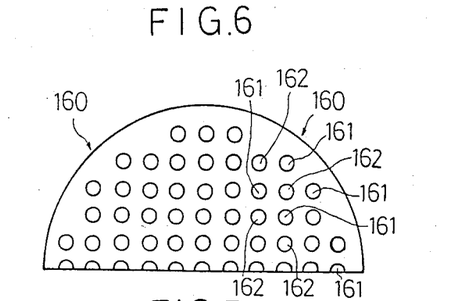
FIG. 6 is a partial plan view of another one of the foams employed in manufacturing the first embodiment.
Figure 7:
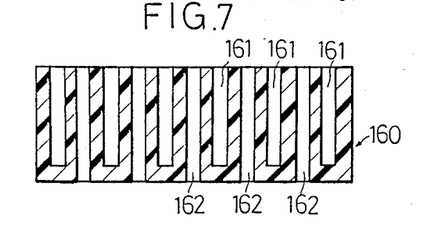
Figure 8:
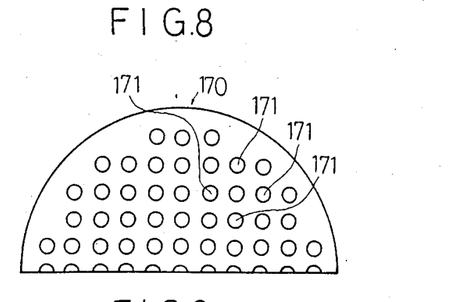
FIG. 8 is a partial plan view of still another one of the foams employed in manufacturing the first embodiment of the porous ceramic structure.
Figure 9:
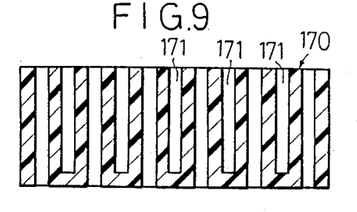

In manufacturing the structure 2, a foam 150 indicated in FIGS. 4 and 5 is placed upon another foam 160 shown in FIGS. 6 and 7 in the manner that the holes 152 of the foam 150 and the holes 161 of the foam 160 join. Then the foams 150 and 160 are impregnated with a ceramic slurry and then fired out to make the structure 2.

Third Embodiment

Figure 12:
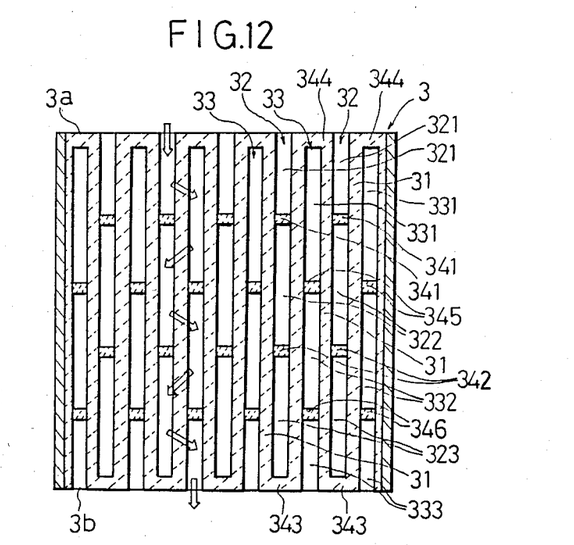
FIG. 12 is a sectional front view of a third embodiment of the porous ceramic structure of this invention.

With reference to FIG. 12 showing a third embodiment of the porous ceramic structure 3 of this invention, the porous ceramic structure 3 comprises porous partition walls 31 forming a multiplicity of two type of passage regions 32, 33 adjacent to one another and extending from the upstream side 3a to the downstream side 3b of the porous ceramic structure 3 and partition portions 341, 342, 343, 344, 345, 346 sectioning said passage regions 32, 33.

Accordingly, the passage regions 32, which the fluid flows into, respectively form three passages, one inlet passage 321 and two intermediate passages, 322, 323 and the passage regions 32 positioned adjacent the passage regions 32 respectively form three passages, two intermediate passages 331, 332 and one outlet passage 333. And, porous walls 31 are positioned between the passages.

The intermediate passages include first intermediate passages 331, into which part of the fluid enters from the inlet passages 321 and passes through the porous walls 31, second intermediate passages 322 into which the fluid enters from the first intermediate passages 331 and passes through the porous walls 31, third intermediate passages 332 into which the fluid enters from the second intermediate passages 322 and passes through the porous walls 31, and fourth intermediate passages 323 into which the fluid enters from the third intermediate passages 332 and pass through the porous walls 31.

Thus, the porous ceramic structure 3 is so structured that a fluid such as an automobile exhaust gas passes through the porous walls 31 five times before it comes out of the structure 3.

The fluid approaches the upstream side 3a and enters into the inlet passages 32 and then the fluid enters successively into the first, second, third, and fourth intermediate passages 331, 322, 332, 323 and then the outlet passages 333 through the porous wall 31 to come out of the open ends of the outlet passages 333.

The method for manufacturing this porous ceramic structure 3 is explained hereunder.

Figure 13:
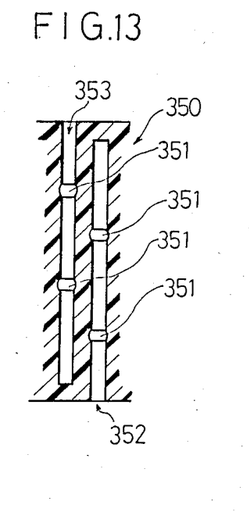
FIG. 13 is a partial sectional view showing a method for manufacturing the third embodiment of the porous ceramic structure illustrated in FIG. 12.

A polyurethane foam structure 350 showing in FIG. 13 is manufactured and then ventilation of each cells is enhanced by eliminating its cell films. Then, the foam 350 is impregnated with a ceramic slurry and then dried. The methods for the impregnation and drying are the same as those set forth for the first embodiment.

In order to manufacture a honeycomb form in which the fluid passes through the porous walls five times when it flows from the inlet passages to the outlet passages, two ceramic plugs 351 with a round or stick shape or the like, which are made of the same material or the like as that used for the porous ceramic structure 3, are inserted to the desired portions of holes 352, 353 as illustrated in FIG. 13. The plugs 50 are slightly larger than the inner diameter of the holes 352, 353 and because the foam structure 350 is made of polyurethane, the plugs 351 can be easily fixed at desired positions by pushing them to the desired positions in the holes 352, 353.

The plugs 351 are fixed at all of the positions corresponding to the partition portions illustrated in FIG. 12. In addition, the plugs 351 inserted into the holes 352 and the plugs 351 pushed into the holes 353 are alternately positioned as shown in FIG. 13. The porous ceramic structure 3 in which the fluid passages through the porous walls 31 five times when it flows from the inlet passages 321 to the outlet passages 333 can be manufactured by firing the above structure in the same manner as set forth for the first embodiment.

The porous ceramic structure in which the fluid passes through the porous walls 31 as many times as desired can be easily manufactured by this method.

Figure 14:
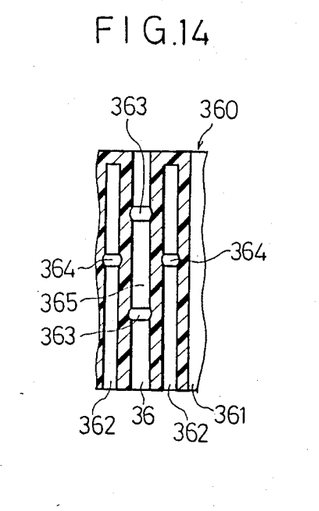
FIG. 14 is a partial sectional view showing a method for manufacturing another third embodiment of the porous ceramic structure of this invention.

Further, as illustrated in FIG. 14, a foam 360 having through holes 361 which are open at both ends, and another holes 362 which are positioned adjacent to the through hole 361, and closed at the upstream side and open at the downstream side can be employed in manufacturing a porous ceramic structure in which the fluid passes four times through the porous walls. In order to manufacture this structure, two plugs 363 are inserted to intermediate portions of the through-holes 361, and one plug 364 is inserted in the hole 362 to be positioned approximately at the side of the center of the intermediate passage 365, and then the foam 360 is processed in the above mentioned method.

Figure 15:
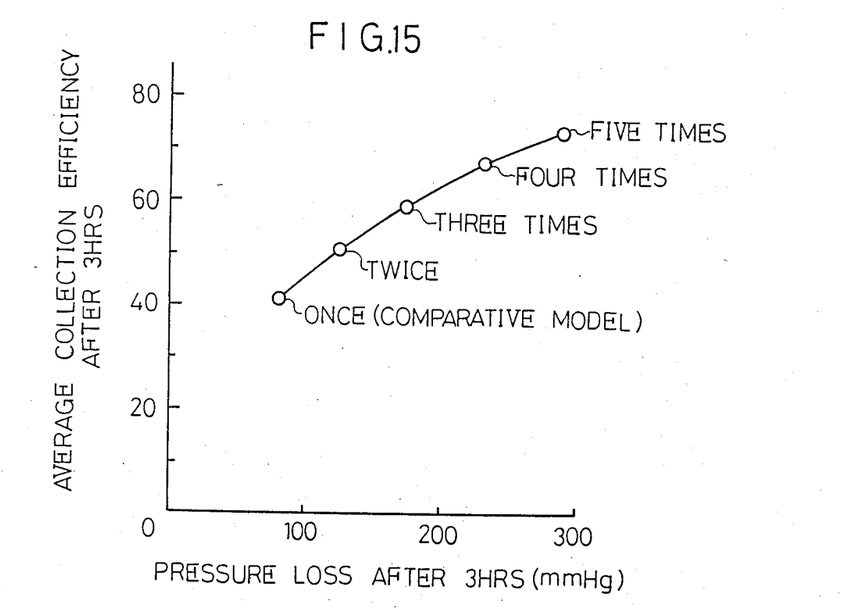
FIG. 15 is a graph showing the efficiency of particulates collection of the first, second, and third embodiments of the porous ceramic structure of this invention.

FIG. 15 indicates the relationship of an average collection efficiencies and pressure losses of said embodiments as regards in relation to the number of times that the exhaust gas passes through the porous walls thereof. In addition, all of the the structures employed in the test have an identical diameter and length, and the diameter, form and number of the inlet passages respectively having an inlet opening portion and the outlet passages respectively having an outlet opening portion are also identical in all of the structures. Further, the collection efficiency and pressure loss were measured three hours after the test had commenced.

As illustrated in FIG. 15, the collection efficiency is greatly enhanced and most of the parts of the structure can be efficientry utilized for the particulates collection by letting the exhaust gas pass through the walls twice or more than twice.

The porous ceramic structure of this invention can provide various levels of its embodied structures collection efficiency with the outer appearance of the structure being the same. Therefore, the porous ceramic structures of this invention can be employed in various applications.

Fourth Embodiment

The passages positioned next to one another for letting the fluid flow from the upstream side to the downstreams side in the structure may be arranged in a manner that more number of the passages are provided to the central portion of the structure than the peripheral portion.

Figure 16:
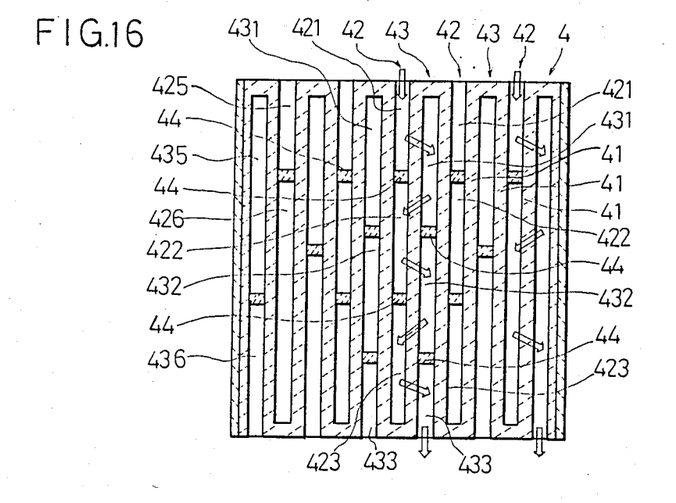
FIG. 16 is a sectional view of a fourth embodiment of the porous ceramic structure of this invention.

With reference to FIG. 16 showing a fourth embodiment 1d of the porous ceramic structure of this invention, the porous ceramic structure 4 comprises porous partition walls 41 forming a multiplicity of two types of passage regions 42, 43 adjacent to one another and partition portions 44 sectioning said passage regions 42, 43. The number of intermediate partition portions 44 for respective passage regions in the central portion of the structure 4 are two, thus forming three passage, one inlet passage 421 and two intermediate passages 422, 423 or two intermediate passages 431, 432 and or one outlet passage 433.

The number of intermediate partition portion 44 for respective passage regions in the peripheral portion of the structure 4 is one, thus forming two passage, one inlet passage 425 and one intermediate passage 426 or one intermediate passage 435 and one outlet passage 436.

Accordingly, a fluid such as an automobile exhaust gas passes through the porous walls 41 five times in the central portion thereof and three times in the peripheral portion thereof.

Figure 17:
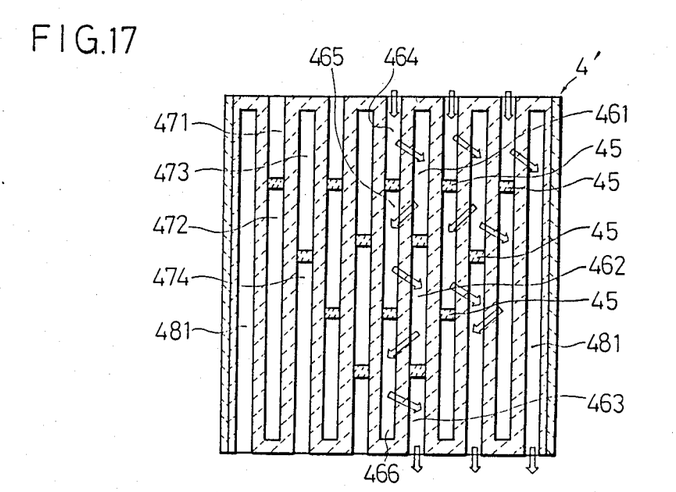
FIG. 17 is a sectional front view of another fourth embodiment of the porous ceramic structure of this invention.

Referring now to FIG. 17 showing modified fourth embodiment 4', the number of intermediate partition portions 45 for respective passage regions in the central portion is two, and three passages, two intermediate passages 461, 462 and one outlet passage 463 or one inlet passage 465 and two intermediate passages 466, 467 are formed.

The number of intermediate partition portion at each passage regions of the outermost peripheral portion of the structure 4' is zero, therefore the passage regions form one outlet passage 471 only.

The number of intermediate partition portions 44 for respective passage regions in the portion positioned between the central portion and the outermost peripheral portion is one, thus forming two passages, one inlet passage 471 and one intermediate passage 472 or one intermediate passage 473 and one outlet passage 474.

Accordingly, a fluid such as an automobile exhaust gas passes five times through the porous walls in the central portion, three times through the porous walls in the portion positioned between to the central portion and the outermost peripheral portion, and once through the porous walls in the outermost peripheral portion.

Fifth Embodiment

Figure 18:
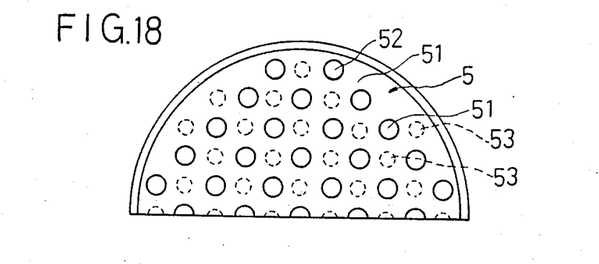
FIG. 18 is a partial plan view of a fifth embodiment of the porous ceramic structure of this invention.

A fifth embodiment 5 of the porous ceramic structure of this invention is so structured as illustrated in FIG. 18 that the inner diameter of passage regions 51, which the fluid flows into, is larger than those of other passage regions 52 positioned adjacent to the passage regions 51.

The inner diameter of the passage regions 51, however, may be made smaller than those of other passage regions 52 according to requipments.

Sixth Embodiment

A sixth embodiment 6 of the porous ceramic structure of this invention is so structured as illustrated in FIG. 19 showing a partial plan view thereof that passsage regions 63 having intermediate passages 631 into which a fluid such as an automobile exhaust gas enters from inlet passages 621 and through porous walls 61, are surrounded by other passage regions 62 having the inlet passages 621.

Further the passage regions 62 respectively having one of the inlet passages 621 may be surrounded by the passage regions 63 respectively having one of the intermediate passages 631.

Seventh Embodiment

A seventh embodiment 7 of the porous ceramic structure of this invention is so structured as illustrated in FIG. 20 that the inner diameter of inlet passages 721 and outlet passages 732 are larger than that of intermediate passages 722, 731 which are positioned next to the inlet passages 721 and outlet passages 732.

Further the inner diameter of the inlet passages 721 and outlet passages 732 may be made smaller than that of the intermediate passages 722, 731 according to requipments.

In addition, when the structure includes first and second or more intermediate passages, the inner diameters of those passages may be made either in the same size or difference sizes.

Eighth Embodiment

As illustrated in FIG. 21, the entire inner surface of a plurality of passages 821 and 831 extending from the upstream side to the downstream side of an eigth embodiment 8 of the porous ceramic structure of this invention are coated with activated alumina 85. Prefeablly, the coated alumina is limited to 5–40% by weight of the structure 8.

The structure may be coated with the activated alumina by a conventional technique, for example, the structure 8 is impregnated with a slurry composed of $\gamma$-alumina, whose specific surface area is 80 m$^2$/g, silica sol and organic binder, then dried and fired at a temperature of 800° C. for about one hour.

Although this invention is described by said embodiments of which the cross sections of the passages are round, they may be square, triangle or the like. And, the length of the passages may be adjusted as required.

Although the partition portions of these embodiments let a certain amount of fluid pass through due to their three dimensional network structure, they may be made air-tight.

Further, although the porous walls of these embodiments are three dimensional network structure, they may be other structures suitable for a collection of the particulates.

Particulates contained in a fluid such as an automobile exhaust gas can be collected evenly in the porous ceramic structure of this invention, and thus particulates collection rates thereof are higher than those of conventional porous ceramic structures.

When the porous ceramic structure of this invention is so structured as explained with the fourth embodiment that the number of intermediate partition portions of passage regions are provided more to the central portion than to the peripheral portion thereof and thereby the fluid such as automobile exhaust gas passes through more porous walls in the central portion than in the peripheral portion, particulates contained in the fluid are collected even more evenly and thereby the efficiency of particulates collection is further enhanced. This is because the fluid flows more in the central portion than in the peripheral portion.

When the entire inner surface of the passages of the porous ceramic structure of this invention, are coated with activated alumina, the particulates collection efficiency of the structure improves ten percent as compared with the ones because the activated alumina also collects the particulates, and thereby the collection efficiency of the porous ceramic structure of this invention becomes very superior to conventional porous ceramic structure.

This invention may be embodied in other specific forms without departing from the spirit or essential sharacteristic thereof. The present embodiments are therefore to be considered in all of the invention being indicated by the appended claim rather than by the forgoing description and all changes which come within the meaning and range of equivalency of the claim are therefore intended to be embraced therein.

What is claimed is:

1. A porous ceramic structure comprising porous partition walls forming a multiplicity of passage regions positioned adjacent to one another and extending from the upstream side to the downstream side of said porous ceramic structure and partition portions sectioning said passage regions, said passage regions are respectively provided with at least one of said partition portions and some of said passage regions are provided with at least two of said partition portions to form at least one intermediate passage having said partition portions on both the upstream and downstream sides thereof and one end passage having at least one open end and one closed end, said end passages comprise inlet passages which are open at the upstream side thereof and closed by said partition portions at the downstream side thereof and outlet passages which are closed by said partition portions at the upstream side thereof and open at the downstream side thereof, and said partition portions positioned at intermediate portions of said passage regions are located respectively at positions corresponding to intermediate portions of at least one of said intermediate passages positioned adjacent thereto with said porous partition walls therebetween.

2. The porous ceramic structure according to claim 1 in which some of said passage regions are provided respectively one intermediate partition portion positioned at an intermediate portion of said some of said passage regions, and at least one of said passage regions positioned adjacent to said some of said passage regions with said porous partition walls therebetween are provided with two partition portions, one at the upstream side and the other at the downstream side of said intermediate partition portion with said porous partition walls therebetween.

3. The porous ceramic structure according to claim 2, in which some of said passage regions, in which a fluid flows, are respectively provided with two partition portions, one intermediate partition portion which is positioned at intermediate portion of said some of said passage regions, and one lower-end partition portion which closes the lower-end of said some of said passage regions to form one inlet passage and one intermediate passage positioned at the downstream side of the inlet passage, said passage regions positioned adjacent to said some of said passage regions are respectively provided with two partition portions, one upper-end partition portion which closes one of the upper-end of said passage regions and one intermediate partition portion which is positioned at one of the intermediate portion of said intermediate passages formed in said some of said passage regions adjacent to said other passage regions with said porous walls therebetween to form one intermediate passage and one outlet passage positioned at the downstream side of said intermediate passage.

4. The porous ceramic structure according to claim 2 in which some of said passage regions, which the fluid flows into, are respectively provided with one intermediate partition portion which is positioned at intermediate portion thereof to form one inlet passage and one outlet passage, and passage regions positioned adjacent to said some of said passage regions are provided with two end partition portions, an upper-end partition portion and a lower-end partition portion to form one intermediate passage.

5. The porous ceramic structure according to claim 1, in which some of said passage regions are respectively provided with at least three partition portions to form at least two intermediate passages.

6. The porous ceramic structure according to claim 5 in which said passage regions are respectively provided with three partition portions, two intermediate partition portions and an upper-end or lower-end partition portion and thereby some of said passage regions, which the fluid flows into, respectively form three passages, one inlet passage and two intermediate passages at the downstream side of said inlet passage, and said passage regions positioned adjacent to said some of said passage regions respectively form three passages, two intermediate passages and one outlet passage at the downstream side of said intermediate passages.

7. The porous ceramic structure according to claim 1 in which said intermediate partition portions sectioning of said passage regions are provided more to the central portion of said porous ceramic structure than to the peripheral portion of said porous ceramic structure and thereby said intermediate passages which are formed as part of said passage regions, are provided more to said central portion than to said peripheral portion.

8. The porous ceramic structure according to claim 7 in which the number of said intermediate partition portions sectioning said passage regions positioned in said central portion is two, said passages regions positioned in said central portion respectively form three passages, two intermediate passages and one inlet passage or one outlet passage, and the number of said intermediate partition portions at said passage regions positioned in said peripheral portion is one, therefore each of the passage regions forms two passages, one intermediate passage and one inlet passage or one outlet passage.

9. The porous ceramic structure according to claim 7 in which the number of said intermediate partition portions sectioning said passage regions positioned in said central portion is two, each passage regions respectively form three passage, two intermediate passages and one inlet passage or one outlet passage, the number of said intermediate partition portions sectioning said passage regions positioned in the outermost peripheral portion is zero, said passage region respectively form one outlet passage, and the number of said intermediate partition portions sectioning said passage regions positioned in the peripheral portions located between said central portion and said outer most peripheral portion is two of said passage regions respectively form one intermediate passage and one inlet passage or one outlet passage.

10. The porous ceramic structure according to claim 3 in which said partition portions are porous and molded in one body with said porous partition walls.

11. The porous ceramic structure according to claim 6, in which said partition portions are ceramic plugs placed in the structural member of said porous partition walls.

12. The porous ceramic structure according to claim 11 in which said plugs are ceramic structural members having a round or stick shape.

13. The porous ceramic structure according to claim 1 in which the inner diameter of some of said passage regions, which the fluid flow into, are larger than the inner diameter of passage regions positioned adjacent to said some said passage regions.

14. The porous ceramic structure according to claim 1 in which the whole inner surface of said passages extending from the upstream of said structure to the downstream side of said structure are coated with activated alumina.

15. The porous ceramic structure according to claim 14 in which 5-40% of said structure, by weight ratio, is coated with said activated alumina.

* * * * *